Friedrich M. O. Förster,
INVENTOR.
BY.
ATTORNEY.

United States Patent Office 3,528,003
Patented Sept. 8, 1970

3,528,003
SENSOR FOR INSPECTING A TEST PIECE FOR INSIDE AND OUTSIDE FLAWS UTILIZING MEANS RESPONSIVE TO THE TYPE OF FLAW FOR ADJUSTING THE THRESHOLD OF THE SENSOR
Friedrich M. O. Förster, 144 Der Schoene Weg, 741 Reutlingen, Germany
Filed Nov. 28, 1967, Ser. No. 686,192
Int. Cl. G01r 33/12
U.S. Cl. 324—37                               11 Claims

ABSTRACT OF THE DISCLOSURE

The present invention relates to nondestructive testing and more particularly to means for locating defects in a workpiece, determining whether the defect is unacceptable and if it is indicating the characteristics and location of the defect. In the embodiments of the invention disclosed herein this is accomplished by providing a pick-up probe for scanning the workpiece to locate any stray magnetic fields produced by any inside or outside defects, such as cracks, together with means to indicate the size and location of the defect. Means, such as an eddy current probe, are provided for simultaneously scanning the workpiece to locate surface defects and modifying the response of the system to the stray fields according to whether the defect is on the inside surface or outside surface. Means are also provided for determining whether the defect is acceptable or unacceptable and to mark the workpiece accordingly.

---

In nondestructive testing systems the workpiece is normally scanned by a pickup probe to determine whether there are any objectionable defects. In addition to determining whether or not there are any defects present, it is desirable to determine whether the defect is small enough to be within an acceptable range or is so large as to require rejecting the workpiece. In order to facilitate repairing, and for other reasons, it is desirable to indicate the location of the defect, i.e. whether it is in the surface or buried inside of the workpiece.

In a so-called magnetic nondestruction testing system the workpiece is magnetized whereby magnetic stray flux fields are produced above the outside surface. If the workpiece is homogenous and free from any discontinuities the magnetic field adjacent the surface of the workpiece is also essentially homogenous and free from any discontinuities. However, if there is a discontinuity such as a crack, void, inclusion, etc., there is also a corresponding disturbance in the stray field above the surface of the workpiece. This is true whether the discontinuity is deep within the workpiece or near the outside surface. By scanning the surface of the workpiece with a suitable probe it is possible to locate variations in the stray fields and identify the presence of a defect in the workpiece.

The magnitude of the stray field is a function of the size of the defect. Accordingly, by measuring the field it is possible to determine the size of the defect. However, the field is also a function of the depth of the defect below the surface with the field from the surface cracks being several times greater than for subsurface cracks. When a stray field is detected above the surface of a workpiece, such as a pipe, it has been extremely difficult if not impossible, to determine the size of the discontinuity or its location by merely measuring the intensity of the stray flux field. More particularly, it cannot be readily determined whether a small disturbance in the magnetic field is produced by a small and acceptable discontinuity on the exterior surface, or a very large and unacceptable defect buried deep within the workpiece.

It can thus be seen that althouggh prior magnetic types of nondestructive testing systems have been capable of locating defects, they have not been capable of accurately and reliably resolving the size and location of a defect, particularly where the defect may be buried deep beneath the exterior surface being scanned.

The present invention provides means for overcoming the foregoing difficulties. More particularly, means are provided for inspecting a workpiece at high rates of speed and automatically determining the location and depth of the discontinuity and whether it is small enough to be within an acceptable range or is so large as to be an unacceptable defect.

In the present invention this is accomplished by providing a search unit for scanning the workpiece and having a probe for measuring the stray fields. A first channel is coupled to the probe to respond to the signals produced by the probe and mark the workpiece as to whether it has defects and if so the nature of the defect. The search unit also includes a second probe for measuring the fields reradiated from eddy currents circulating on the surface of the workpiece whereby surface defects are located. Means are coupled to the second probe and to the first channel to condition the channel whereby it responds properly to the magnetic signals to indicate whether the defect is on the inside or outside.

These and other features and advantages of the present invention will become apparent from the following detailed description of a limited number of embodiments thereof, particularly when taken in connection with the accompanying drawings wherein like reference numerals refer to like parts and wherein.

Figure 1:
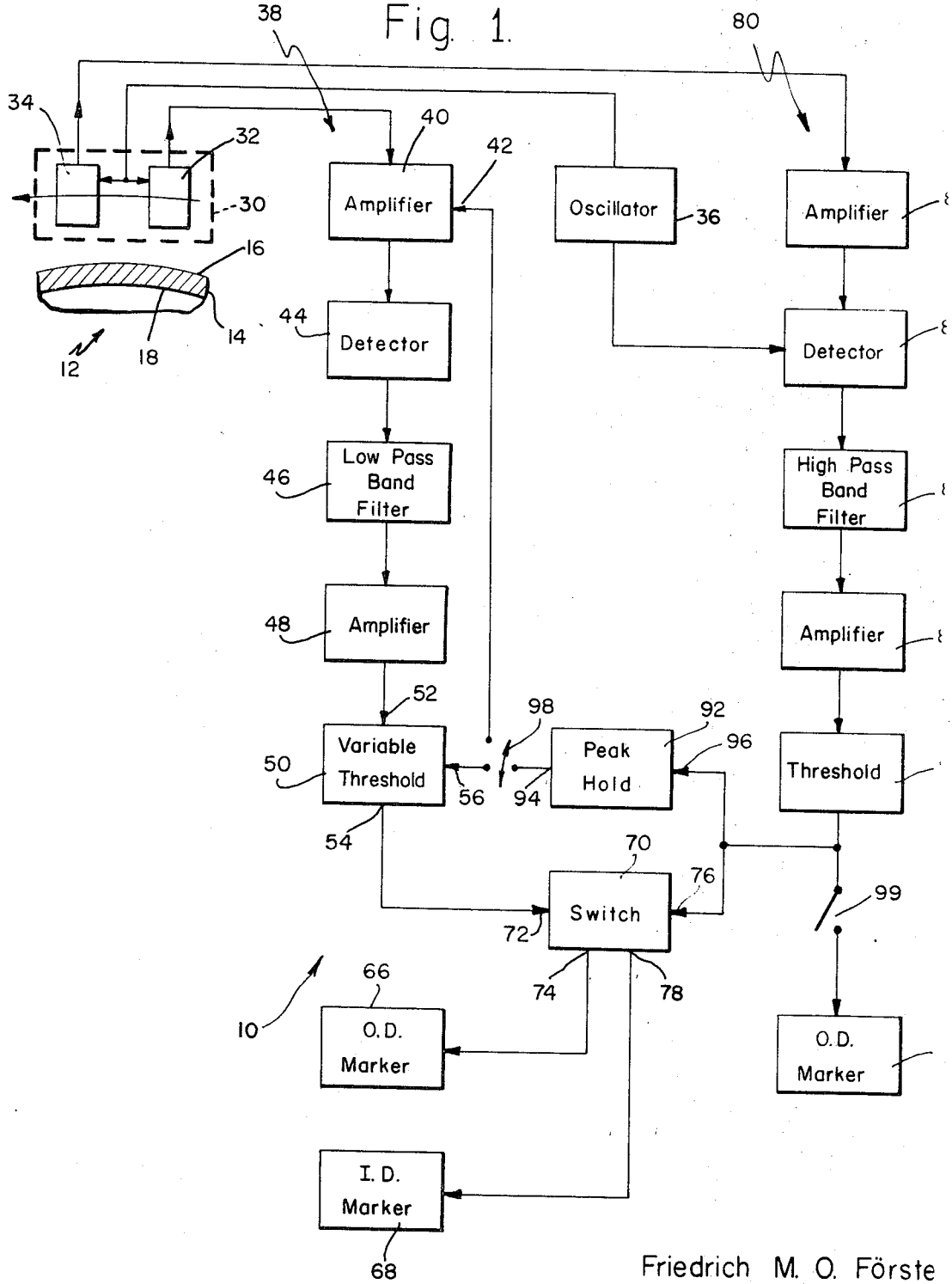
FIG. 1 is a block diagram of a nondestructive testing system utilizing the present invention.

Referring to the drawings in more detail the present invention is embodied in an inspection system 10 for locating defects in workpieces. Any type of workpiece may be inspected by the present system, such as flat plates, bars, rods, etc. However for illustrative purposes the present system 10 is shown inspecting a hollow pipe 12 having a generally cylindrical shape. The pipe 12 includes a ferromagnetic wall 14 with an external or outside surface 16 and an internal or inside surface 18. The wall 14 is hopefully homogenous and uniform throughout and free from any irregularities or discontinuities. Also, the wall 14 is hopefully of uniform thickness.

As a practical matter, under certain circumstances the pipe 12 may have one or more discontinuities therein, such as cracks, etc. These may result from faulty materials, variations in the manufacturing process, etc. For example, in one type of pipe a strip of material is formed into a cylinder and the adjacent edges welded together. Under some circumstances the welded seam may have cracks on the inside or outside thereof. The present invention is effective to locate and identify these cracks.

Figure 3:
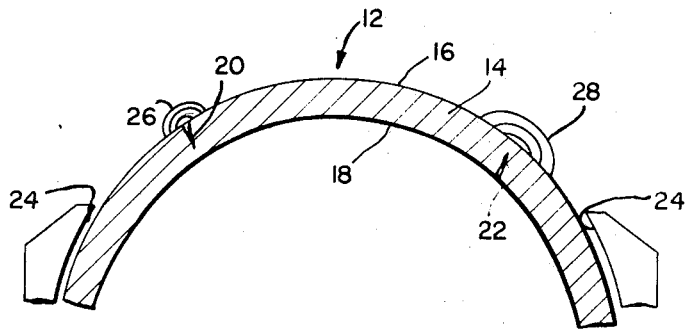
FIG. 3 is a cross sectional view of a portion of a workpiece being scanned by a search unit of the system of FIG. 1 and showing typical stray fields present adjacent the workpiece.

The most common types of cracks are shown in FIG. 3. One type of crack 20 (i.e. an outside defect) extends inwardly from the outer surface 16. Another type of crack 22 (i.e. the inside defect) extends outwardly from the inner surface 18. If a pipe is heavily stressed these cracks cause stress concentration and may lead to an eventual failure of the pipe 12. However, many pipes are not heavily stressed and relatively minor and small cracks of either the inside or outside variety may be tolerated. It is, therefore, desirable to inspect the pipe 12 and grade it for high stress applications if it is free of serious cracks and reject it or down grade it to low stress application if it is not.

Normally the critical dimension of a crack is its depth, i.e. the extent to which it penetrates the wall 14. Accordingly to one commonly employed standard, a pipe may be classified as acceptable if it does not contain any cracks or other types of defects which extend into the wall deeper than some limit, such as 12½% of the wall thickness. If a crack on either the outside or inside surfaces 16 or 18 exceeds this depth, it is necessary to reject the pipe 12, repair the crack and/or downgrade the pipe 12 into a category where it will be very lightly stressed.

The present system 10 utilizes a magnetic type of testing wherein the pipe 12 is magnetized to produce stray magnetic flux fields above the outside surface 16, particularly in the region of any cracks, etc. The pipe 12 may be magnetized by passing between a pair of pole faces 24 of a magnet. Also an electric current may be circulated axially of the pipe 12 so as to produce a circumferential field. If the wall 14 of the pipe 12 is homogenous, the magnetic field within the wall 14 and immediately above the outside surface 16 will be homogenous. However, in the event there is a discontinuity in the wall 14 there will be a resultant pertubation in the field, particularly that portion of the field just above the surface 16. This is commonly referred to as a stray magnetic field.

As best seen in FIG. 3, a crack 20 in or very near the outside surface causes a stray field 26 on the outside of the pipe 12 having a relatively large flux density and high radial and circumferential gradients. In addition the field has a relatively small geometric shape. A crack 22 on or near the inside surface 18 produces an external stray field. However, since this crack 22 is remote from the outside surface 16 the stray field 28 has a smaller flux density as well as lower radial and circumferential gradients. Also, the field 28 tends to have a somewhat larger geometric shape spreading over a wider area of the pipe 12.

It is not unusual for a given size crack 20 on the outside surface 16 to produce a stray field 26 having a flux density on the order of up to say 5 times as great as the field 28 produced by an inside crack 22 of identical size. Under these circumstances an insignificant outside crack 20 of say 5% depth will produce a field of about the same intensity as a major inside crack of say 25% depth. It can, therefore, be appreciated that although both outside and inside cracks 20 and 22 can be located from the stray fields 26 and 28 above the outside surface 16, it is extremely difficult, if not impossible, to determine whether it is caused by a small outside crack of acceptable depth or a large internal crack or sufficient depth to require a rejection of the pipe.

The present system 10 is capable of measuring the stray fields 26 and 28 around the pipe 14, determining whether the crack producing the field is inside or outside and determining whether the depth of the crack exceeds a level requiring a rejection or repair of the pipe 14. More particularly the system 10 employs a search unit 30 which is adapted to scan the outside surface 16 of the pipe 14 and pass through any stray fields. The search unit 30 may be scanned around the pipe 14 in any desired manner. For example, the pipe 14 may be rotated and advanced axially past a stationary search unit, the search unit may be rotated around the pipe as the pipe moves axially therepast, etc. Such scanning insures the entire exterior 16 of the pipe 14 being scanned in a helical pattern.

The search unit 30 may include a single transducer of the type disclosed and claimed in copending application Ser. No. 677,990 filed in the name of Friedrich M. O. Förster. However, in the present embodiment the search unit 30 includes two slightly separated pickup probes 32 and 34 for simultaneously scanning the outside surface 16 along a common scan line. The first probe 32 is positioned close to the surface 16 so as to pass through the stray fields present above the outside surface. The probe 32 may include a single transducer which is responsive to the absolute value of the stray field and effective to produce an electrical signal which is a function of this value. Alternatively the probe 32 may include a pair of transducers which are slightly spaced from each other. The difference between the signals from the two transducers is a function of the gradient of the field over the distance between the two transducers.

The first probe 32 may be of any desired variety. For example, it may be of the type disclosed and claimed in copending application Ser. No. 644,961, filed June 9, 1967 in the name of Friedrich M. O. Förster. Such a transducer includes a core of magnetic material with a primary winding and a secondary winding. The primary winding is coupled to an oscillator 36 and the secondary winding produces a signal which basically has the same frequency as the oscillator 36, but as this signal is distorted by a magnetic field the amplitude of its second harmonic is modulated as a function of the field density.

The first probe 32 is coupled to the input of a first channel 38 for determining the characteristics of the pipe 12 by measuring the stray magnetic fields 26 and 28. The input to this channel 38 includes an AC amplifier 40 for increasing the amplitude of the signal to a more useful level and to improve the signal-to-noise ratio. The amplifier 40 includes a control input 42 for varying the gain.

By way of example, when the input 42 is at a low level or there is no signal present, the gain may be high. Conversely when the input 42 is at a high level the gain may be reduced to a low level. If the probe 32 includes only a single transducer the amplifier 40 is of a single ended variety and the amplified signal is a function of the absolute value of the stray field. This type of arrangement is useful where the absolute value of the characteristic is important.

Very frequently, however, the probe 30 includes a pair of transducers. Under these circumstances the amplifier 40 is of the double ended variety and is coupled to the transducers. The amplifier 40 then functions in a differering mode and responds to the difference between the signals from the transducers. If the two signals are identical ,i.e. the stray field is uniform, there is no difference and no output signal from the amplifier 40. The absolute values are cancelled out. However, if the signals are not identical (i.e. the stray field is irregular) this difference is amplified and the resultant amplified signal is a function of only the gradient of the stray field occurring over the distances between the two transducers.

A detector 44 is coupled to the output of the amplifier 40 so as to rectify or detect the amplified difference signal. The exact characteristics of the detector 44 are, of course, dependent upon the nature of the signals produced by the amplifier 40. Normally this signal includes a carrier wave having a frequency which is the second harmonic of the frequency of the driving signal from the oscillator 36. The amplitude (i.e. the envelope of the carrier wave) is a function of the characteristics of the wall 14 and particularly the gradient of the stray field. The detector 44 is, therefore, effective to remove the second harmonic carrier wave.

As the leading transducer in the probe 32 approaches a crack the stray field is increasing. When the two transducers are on opposite sides of the crack the stray field reaches a maximum value. After the transducers have passed over the crack and are retreating therefrom, the field is decreasing. This produces a signal which passes through zero at a maximum rate of change when the probe 32 passes over the crack. Under some circumstances it is desirable to include a differentiator as a separate circuit or inherent in the detector. By differentiating a signal of the foregoing variety a high amplitude short duration pulse is produced coincident with the probe 32 passing over the crack.

The output from the detector 44 is coupled to a filter 46. The exact characteristics of this filter 46 are dependent upon several factors, but its primary function is to tend to emphasize the signals resulting from the subsurface cracks. When a subsurface crack is present the signal produced by the search unit tends to be primarily in a relatively low frequency range. Also the amplitude of the signal, even in this low frequency range, is relatively low. However, when a surface crack is present the signal from the search unit is of a relatively much larger amplitude and is spread over a relatively much broader frequency spectrum which extends above the lower frequency range of the inside crack. In view of the considerably larger amplitude of the outside signal the lower frequency portion of the signal may be as large as (or even larger than) the inside signal. This filter 46 is, therefore, normally of the so-called low pass variety or has a relatively low frequency pass band. Although the filter will not block the passage of the lower frequency portions of outside signals, it does tend to improve the signal-to-noise ratio, particularly with respect to the lower amplitude signals from an inside crack 22.

The output from the filter 4 is interconnected with an amplifier 48. Normally this amplifier 48 is of the DC variety of at least has a sufficiently low frequency response to preserve the characteristics of very slowly varying signals, such as may result from a long crack. This amplifier 48 is effective to increase the amplitude of the detected signals to a more useful level and to improve the signal-to-noise ratio.

The output of the amplifier 48 is in turn coupled to a threshold or trigger circuit 50. This circuit normally remains inoperative as long as the signal on the input 52 is below some particular threshold level. When the amplitude of the signal on the input exceeds the threshold level the circuit 50 switches its condition and produces and output signal. The output signal persists for so long as the input 52 remains above the threshold level. The threshold level is normally set to correspond to the signal produced by a standard defect, i.e. the maximum acceptable defect. If the pipe 12 is free of any defects the signal will always remain below the threshold level and no signals will be produced at the output 54 of the threshold circuit. If there is a discontinuity, such as a crack 20 or 22, the signal will rise above the threshold level and a singal will be produced.

If desired the threshold level may remain constant. However, in the present instance the threshold 50 includes a control input 56 whereby the level may be changed. For example, in the event no signal is present on the input 52 the threshold level may be set relatively low whereas the presence of a signal will raise the threshold level.

Figure 2:
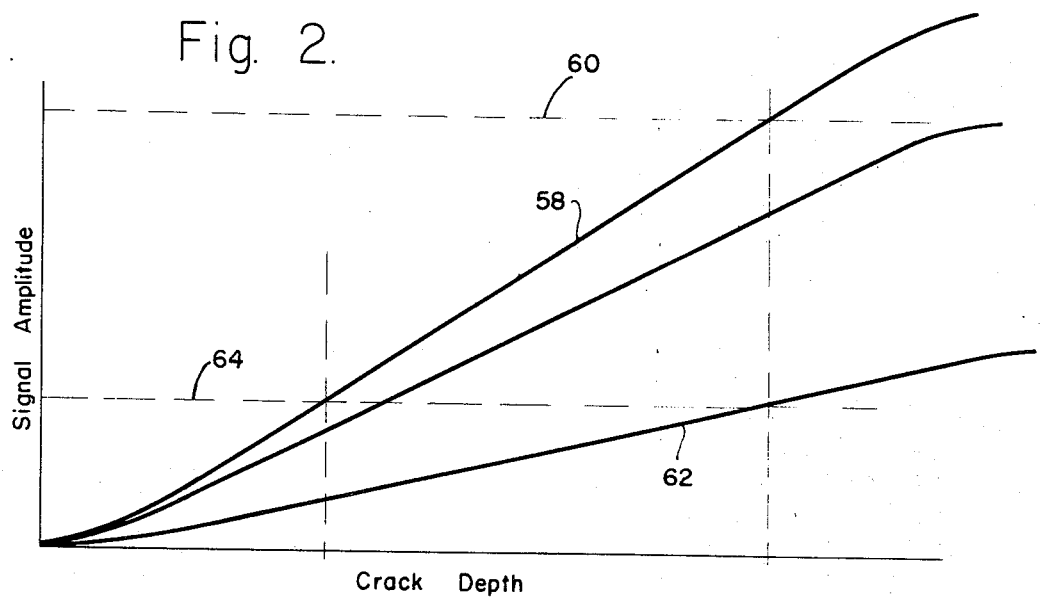
FIG. 2 is a graph illustrating certain operating characteristics of the system of FIG. 1.

The characteristics of the signal from the amplifier 48 are shown in FIG. 2. If the stray field 26 being scanned is caused by an outside crack 20 the signal will follow the line 58. In the event of an unacceptable outside crack the signal will be above the level 60. If the stray field 28 being scanned is caused by an inside crack 22 the signal will follow the line 62. In the event of an unacceptable inside crack the signal will be above the level 64. Accordingly, if an outside crack 20 is being scanned, the signal on the control input 42 should be just large enough to raise the threshold to the level 60 when a standard outside defect is present. Conversely, if an inside crack 22 is being scanned the signal on the control input 42 should be lowered to reduce the threshold to the level 64 when a standard inside defect is present.

It should be noted an outside crack 20 of an acceptable nature may produce a signal considerably in excess of the level 64 corresponding to an unacceptable inside crack 22. Accordingly, it is extremely difficult, if not impossible, to merely measure the strength of the stray field 26 or 28 and determine whether it is caused by an acceptable outside crack 20 or an unacceptable inside crack 22.

An alarm or similar device may be coupled to the threshold circuit 50 to indicate the occurrence of a signal in excess of the aceptable limit. In the present instance a pair of markers 66 and 68, such as paint spray guns, are coupled to the threshold circuit 50 by a switch 70. Whenever the threshold circuit 50 produces a signal, the switch 70 will couple the signal to a spray gun, etc. so as to mark the pipe 12 to indicate that an unacceptable inside or outside defect is present. The switch 70 may be of any desired variety. However, it is normally of a relatively fast acting electronic variety whereby the input 72 is coupled to the output 74 when a high signal is present on the control input 76 and to the output 78 when a low signal is present on the input 76.

The second channel 80 may be similar to the first channel 38. However, it is primarily intended to locate surface defects and condition the first channel 38 whereby it responds in an appropriate manner.

Figure 4:
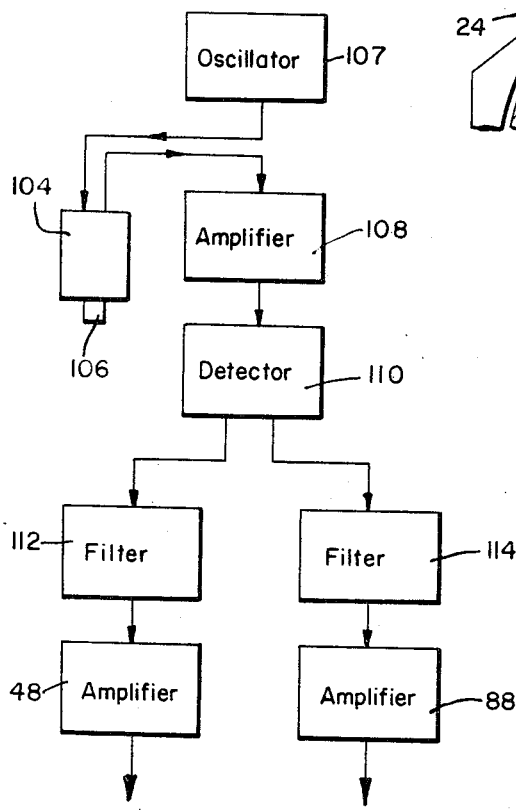
FIG. 4 is a block diagram of a portion of a nondestructive testing system utilizing another embodiment of the present invention.

As previously mentioned, the frequency spectrum of the magnetic signal for an inside crack differs significantly from the signal for an outside crack in that the frequency spectrum is considerably higher for an outside crack than for an inside crack. Accordingly, the second probe 34 may be of a magnetic type similar to the first one and this type of system is shown in FIG. 4. However, eddy current probe systems which are fed with a relatively high frequency induce such eddy currents in the test piece which circulate only on or very near the outside surface. Accordingly, the second probe 34 is of the so-called eddy current variety such as disclosed and claimed in copending application Ser. No. 641,658 filed May 26, 1967 in the name of Friedrich M. O. Förster. In such a probe the absolute value of the eddy current signal is cancelled whereby only a difference signal is left.

The probe 34 is coupled to an amplifier 82 in the input to the second channel 80. The amplifier 82 is effective to increase the signal to a more useful level and to improve the signal-to-noise ratio. The output from the amplifier 82 is connected to a detector 84. This detector 84 may be of conventional design and similar to the detector 44 in the first channel 38. However, it is to be noted there are several differences between an eddy current signal and a magnetic signal. First of all this signal is not a second harmonic but has a carrier wave corresponding to the frequency of the driving signal from the oscillator 36. The detector may be essentially a rectifier capable of removing the carrier wave and leaving only the amplitude modulated envelope. However, the phase of the signal may be of interest since it is related to certain characteristics of the surface. Accordingly the detector 84 is a phase sensitive rectifier coupled to the oscillator 36.

The output of the detector 84 is coupled to a filter 86. The exact characteristics of this filter 86 are also dependent upon the characteristics of the system, cracks, etc. However, since this channel 80 is only concerned with surface cracks the filter 86 is normally of the high pass variety or is of the pass band variety with a high band. Since substantially all of the inside signal is in a lower frequency range substantially all of the inside signal is suppressed. Accordingly, in the channel 80 only the outside signal is passed. This is in contrast to the filter action in channel 38 wherein the inside signal is present and wherein the lower frequency portion of the outside signal is present.

An amplifier 88 is coupled to the output from the filter 86 to increase the amplitude of the detected and filtered signals to a more useful level and to improve the signalto-noise ratio. The output of the amplifier 88 is in turn coupled to the input of a trigger or threshold circuit 90 This circuit 90 is similar to the first threshold circuit 50 in that it will not produce an output signal as long as the signal on the input is below some particular threshold level but will provide an output when the input rises above the threshold level.

Normally this channel 80 is not used to discriminate between acceptable and unacceptable cracks and the theshold level is set just above the level of the background noise. This will insure the threshold 90 switching states whenever a surface crack 16 is scanned, whether it is acceptable or unacceptable. If it is desired to discriminate between large and small outside cracks the threhold may be set to correspond to a certain size crack. However, this size crack should be smaller than that required for the magnetic channel 38 to produce a signal below the level 64.

The output of the threshold 90 circuit is coupled to the control input 76 of the switch 70 and to the input of the peak hold 92. Where there is no signal from the threshold 90 the switch 70 is set such that the variable threshold is coupled to the inside marker 68 whereby the pipe is marked to indicate an inside defect. When a signal is present the switch changes whereby the threshold is coupled to the outside marker whereby a signal from the theshold will cause the pipe to be marked as containing an outside defect.

The peak hold 92 may be a conventional circuit wherein the output 94 remains at a low level when no signal is present on the input 96. However, when a signal is present on the input 96 the output 94 raises to a higher level and remains there for a predetermined short interval beyond the input signal.

The output 94 of the peak hold 92 is coupled to a single pole double throw switch 98, one side of which leads to the control input 42 of the amplifier 40 and the other side of which leads to the control 56 input of the variable threshold 50.

Each time the probe 34 passes over a surface crack 20 a signal will be produced which switches the threshold circuit 90 and causes the peak hold 92 to produce a signal on its output 94. This signal will persist for a short period of time, for example the time required for the probe 34 to scan across the area of the crack 20 a second time.

When the switch 98 is in the first position the peak hold 92 is coupled to the amplifier 40. In the event there are no surface cracks 20 there will be no signal on the input 42 and the gain of the amplifier 40 remains high. The gain is sufficiently high to cause the signal produced by a standard inside defect 22 to just equal the level required to switch the threshold 50. In the event a surface crack 20 is present the signal from the peak hold 92 reduces the gain whereby a standard outside defect produces a signal just equal to the level of the threshold 50. This arrangement insures the amplitudes of the signals from the amplifier 40 being a substantially constant function of the depth of the cracks whether they are on the inside 18 or the outside 16. As a consequence the reject level for the threshold 50 may remain substantially constant at all times.

When the switch 98 is set in the seocnd position the signal from the peak hold 92 is coupled to the control input 56 of the variable threshold 50. Under these conditions the gain of the amplifier 40 reamins constant whereby the ambplitudes of the signals coupled to the input of the threshhold 50 are a constant function of the stray field strength. Since the presence of a signal on the peak hold 92 means a surface crack 20 is present, this signal raises the level required to switch the threshold 50 to a higher level 60 corresponding to a standard surface defect. In the absence of a signal from the peak hold 92 there is no outside crack 20 and the threshold is reduced to correspond to the lower level 64 corresponding to a standard inside crack.

It can be seen regardless of the position of the switch 98 the first channel 38 will not produce an indication of a defect unless there is a crack in excess of the acceptable limit, for example 12½% depth. Even though a small outside crack 20 may produce a stray field 26 of greater intensity than an objectionable inside defect 22, the signal from the peak hold 92 will condition the first channel 38 to prevent marking the pipe 12 under these circumstances.

In order to utilize this embodiment to inspect the pipe 12 (or any other type of workpiece) the pipe is magnetized to produce a circumferential magnetic field in the wall 14. The pipe 12 is scanned by the search unit 30. If the probe 34 passes over an outside surface defect, such as crack 20, the amplifier 88 produces a signal whereby the threshold 90 causes the peak hold 92 to couple a signal to the amplifier 40 and/or the variable threshold 50 in the first channel 38. This will cause the gain of the amplifier to be reduced and/or the threshold level to be raised to correspond to the stronger fields resulting from an outside crack. Also the signal will set the switch 70 whereby the variable threshold 50 is coupled to the OD marker 66 but not the ID marker 68.

If the crack 20 scanned by the probe 32 is within acceptable limits the signal reaching the threshold 50 will be too low to actuate the threshold 50. As a consequence neither of the markers 66 and 68 will be actuated. However, if the crack is of an unacceptable nature the signal will be of sufficient magnitude to change the threshold 50. Since the switch 70 is set, the OD marker 66 will be actuated to indicate an outside defect.

It should be noted that if desired a separate OD marker 100 may be coupled to the threshold 90 either directly or by a switch 99. This will permit marking the pipe 12 to indicate outside defects of a size differing from those actuating the marker 66. As the eddy current probe does not need any magnetization this arrangement is normally used only where outside cracks 20 are of interest.

In the event there are no surface cracks 20, the eddy current probe 34 will not produce a signal and the threshold 50 will not be set. Accordingly the peak hold 92 will not opearte and the sensitivity of the first channel 38 will not be reduced and the gain of the amplifier 40 will be high and/or the level of the threshold circuit 50 will be low. If an inside crack 22 within acceptable limits is scanned, the signal reaching the threshold circuit 50 will not be large enough to set the threshold 50 and neither of the markers 66 or 68 will be actuated. If the crack 22 is of objectionable depth the signal from the amplifier 40 will be large enough to cause the threshold 50 to produce a signal. Since there is no signal from the threshold 90 the switch 70 is coupled to the ID marker 68 and the pipe 12 will be marked to indicate an inside defect is present.

As an alternative the embodiment of FIG. 4 may be used. This embodiment is very similar to the preceding embodiments except for the search unit 10 and the directly related portions of the system. In this embodiment a search unit 104 is provided for scanning the exterior of the pipe 12. However, the search unit 104 includes either a single probe 106 driven by oscillator 107 for measuring the magnetic stray fields 26 and 28 or a probe system having a pair of probes for measuring the field gradient. This probe 106 is connected directly to an amplifier 108. This, in turn, feeds a detector 110 which in turn feeds a pair of filters 112 and 114. As previously described the signal produced by an inside crack and the signal produced by an outside crack have distinctive spectral characteristics. The filter 114 is provided with a high pass band which will produce a signal only when an outside crack is present. The filter 112 has a lower pass band similar to the filter 46. These two filters 112 and 114 are then coupled to the amplifiers 48 and 88. It will be seen these amplifiers 46 and 86 produce essentially the same signals in either of the two embodiments.

While only a limited number of embodiments are disclosed herein, it will be readily apparent to persons skilled in the art that numerous changes and modifications may be made thereto without departing from the scope of the invention. Accordingly, the foregoing disclosure and description thereof are for illustrative purposes only and do not in any way limit the invention which is defined only by the claims which follow.

What is claimed is:

1. A nondestructive testing system for inspecting a workpiece for defects of an outside type located on or near the surface of a workpiece and defects of an inside type located beneath said surface, said system including the combination of, a search unit adapted for scanning the surface of the workpiece, said search unit being effective to produce a signal in response to the presence of a defect, said signal having a magnitude in excess of a first predetermined level when a defect of the first type and of a predetermined size is present and having a second magnitude in excess of a second predetermined level when a defect of the second type and of a predetermined size is present, threshold means connected to the output signal of the search unit and having an adjustable threshold level, said threshold means being effective to provide an output signal only when the signal from said search unit exceeds the threshold level, and means coupled to the said search unit and to said threshold means, said last means being responsive to the type of defect and effective to set the threshold level at said first predetermined level when a first type defect is present and at said second predetermined level when a defect of the second type is present.

2. A nondestructive testing system for inspecting a workpiece for defects of an outside type located on or near the surface of a workpiece and defects of an inside type located beneath said surface, said system including the combination of, a search unit adapted for scanning the surface of the workpiece, and producing a signal in response to the presence of a defect, said signal having a magnitude in excess of a first predetermined level when a defect of one type is present and is larger than a predetermined size, said signal having a magnitude in excess of a second predetermined level when a defect of the other type is present and is larger than a predetermined size, a variable gain amplifier coupled to the search unit for amplifying said signal, threshold means coupled to the output of said amplifier and responsive to said amplified signal and having a threshold level, said threshold means being effective to provide an output signal only when said amplified signal exceeds the threshold level, and means coupled to the said search unit and effective to produce a control signal when a defect of one of said types is present, said last means being coupled to said amplifier whereby said control signal varies the gain of said amplifier, said last means being effective to set the gain of the amplifier such that said amplified signal has an amplitude at least equal to said threshold level when a defect of the first type of said predetermined size is present and to set the gain such that said amplified signal has an amplitude at least equal to said threshold level when a defect of the second type of said predetermined size is present.

3. A nondestructive test system for inspecting a workpiece for defects of an outside type located on or near a surface of the workpiece and defects of the inside type located beneath said surface, said system including the combination of a search unit adapted to scan the surface of the workpiece, said search unit being effective to produce a first type of signal in response to one of said types of defects and a second type of signal in response to the other type of defect, said first type of signal having a magnitude in excess of a predetermined level when a defect of the first type is present and is larger than a predetermined size, said second type of signal having a magnitude in excess of a second predetermined level when a defect of the second type is present and is larger than a predetermined size, trigger means coupled to said search unit and responsive to the signals therefrom, said trigger having a first preselected threshold corresponding to said first preselected level and a second preselected threshold corresponding to said second preselected level, said trigger means being effective to produce an output signal when the signals from the search unit exceeds one of the preselected threshold, and control means responsive to the second type of signal from the search unit and effective to produce a control signal in response thereto, said control means being coupled to said trigger means and effective to set the threshold at the first preselected level or at the second preselected level depending on the type of defect present.

4. The nondestructive testing system of claim 3 wherein:

the search unit includes means responsive to magnetic leakage flux fields adjacent said surface whereby the signals produced thereby correspond to the flux field scanned by the search unit.

5. The nondestructive testing system of claim 4 including:

filter means coupled between the search unit and said control means and responsive to the signals from said search unit, said filter means being effective to separate said first type signals from the second type signals.

6. The nondestructive testing system of claim 3 including:

indicating means coupled to the trigger means and effective to produce a first indication when a first type defect occurs and a second indication when a second type defect occurs.

7. The nondestructive testing system of claim 3 including:

means for scanning said search unit across said surface in a predetermined search pattern whereby the signals from the search unit include a short duration pulse each time a defect is scanned, said control means being adapted to maintain its control signal for a duration at least equal to the time interval within which a defect would normally be rescanned.

8. A nondestructive test system for inspecting a workpiece for outside defects on or near a surface of the workpiece and inside defects beneath said surface, said system including the combination of:

a search unit adapted to scan said surface and produce a first type signal in response to a defect of the inside type and a second type signal in response to a defect of the outside type, said first type signal exceeding a first predetermined level when a first type defect exceeds a predetermined magnitude and said second type signal exceeding a second predetermined level when a second type defect exceeds a predetermined magnitude, first means having a threshold level coupled to said search unit and responsive to the signals therefrom, said means being effective to indicate the presence of a defect when the signal from the search unit exceeds said threshold level, second means coupled to said search unit and responsive to the signals therefrom, said second means generating a signal indicating the type of defect being scanned, said second means being coupled to the first means and effective to set said threshold level to correspond to the predetermined level for the type of defect being scanned.

9. The nondestructive testing system of claim 8 wherein:
the search unit includes means responsive to magnetic leakage flux fields adjacent said surface whereby the signals produced thereby correspond to the flux field scanned by the search unit.

10. The nondestructive testing system of claim 9 including:
filter means connected between said search unit and said second means effective to separate said first type signals from the second type signals.

11. The nondestructive testing system of claim 8 including:
means for scanning said search unit across said surface in a predetermined search pattern whereby the signals from the search unit include a short duration pulse each time a defect is scanned,
said second means being adapted to maintain the set of the threshold level for a duration at least equal to the time interval within which a defect would normally be rescanned.

References Cited
UNITED STATES PATENTS

| | | | |
|---|---|---|---|
| 1,946,196 | 2/1934 | Drake et al. | 324—37 |
| 2,011,425 | 8/1935 | Sperry et al. | 324—37 |
| 2,729,785 | 1/1956 | Keevil | 324—37 |
| 2,744,233 | 5/1956 | Paivinen | 324—37 |
| 3,202,914 | 8/1965 | Deem et al. | 324—40 |
| 3,281,667 | 10/1966 | Dobbins et al. | 324—40 |
| 3,317,824 | 5/1967 | Wood | 324—37 |
| 2,881,387 | 4/1959 | Wood | 324—37 |
| 3,328,681 | 6/1967 | Wood | 324—37 |
| 3,340,466 | 9/1967 | Ono | 324—40 |
| 3,343,079 | 9/1967 | Crouch | 324—37 |

RUDOLPH V. ROLINEC, Primary Examiner

R. J. CORCORAN, Assistant Examiner